United States Patent

Shelor

[15] 3,661,099
[45] May 9, 1972

[54] PALLET DECK

[72] Inventor: Clifford D. Shelor, Covington, Va.

[73] Assignee: Westvaco Corporation, New York, N.Y.

[22] Filed: Apr. 28, 1971

[21] Appl. No.: 138,062

[52] U.S. Cl. ..................................108/51, 108/56, 108/58
[51] Int. Cl. ..........................................................B65d 19/18
[58] Field of Search ...........................................108/51–58

[56] References Cited

UNITED STATES PATENTS

| | | | |
|---|---|---|---|
| 2,432,295 | 12/1947 | Donahue | 108/58 X |
| 2,823,460 | 2/1958 | Weiler | 108/51 UX |
| 3,079,876 | 3/1963 | Doane | 108/50 |
| 3,380,403 | 4/1968 | Sullivan | 108/51 |
| 3,587,479 | 6/1971 | Ceschwender | 108/51 |
| 3,606,844 | 9/1971 | Lubker et al. | 108/51 |

Primary Examiner—Bobby R. Gay
Assistant Examiner—Glenn O. Finch
Attorney—Richard L. Schmalz and W. Allen Marcontell

[57] ABSTRACT

Shipping pallet for large, high density loads having a load receiving deck fabricated entirely from corrugated paper board by adhesively securing a multiplicity of juxtaposed corrugated board strips, flute axes perpendicular to the deck surface, to form a core; and sandwiching said core between corrugated board sheets, flute axes parallel to said deck surface.

10 Claims, 5 Drawing Figures

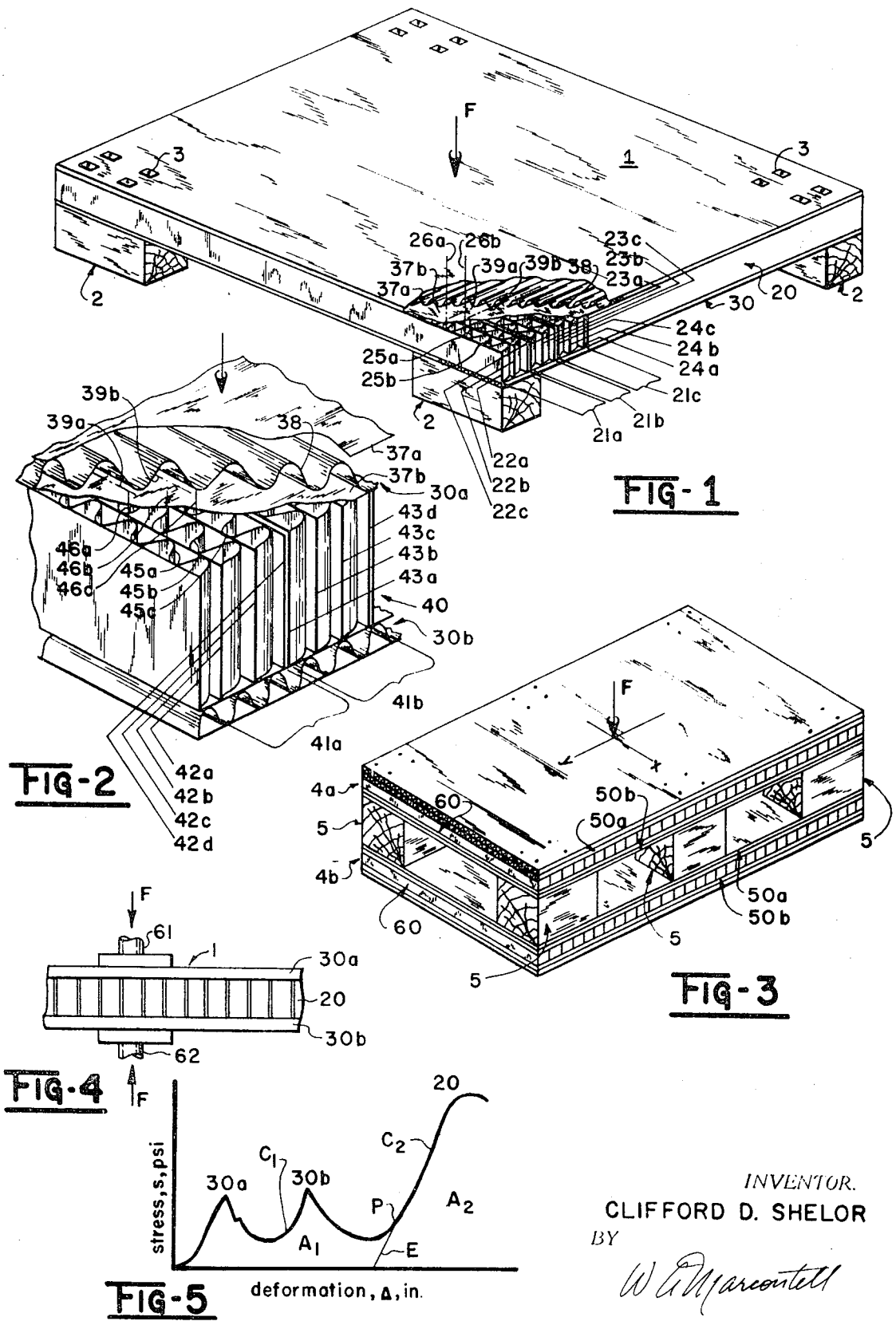

PALLET DECK

BACKGROUND OF THE INVENTION

1. Field of the Invention

This invention relates to those items known to the material handler's art as pallets. Pallets are relatively simple platform structures for supporting bulky and usually very heavy materials or articles. The primary objective served by a pallet is to facilitate mobility of the supported article for removal by a special purpose vehicle known in the art as a fork-lift truck. Legs under the pallet deck surface provide a small, open space therebetween to accommodate cantilevered lifting tines or panels inserted between the lower deck surface and the next vertically adjacent supporting surface.

Other objects served by pallets include: conservation of storage volume by providing a suitable surface for vertical stacking; article spacing for air circulation; floor moisture separation; and article protection from truck tine induced damage.

2. Description of the Prior Art

Pallets for heavy (500 pounds or greater) industrial use are normally constructed of wood planking with considerable hand labor required. When used for transporting articles having a low value density, the cost of the pallet reaches a significant percentage of the article value. Moreover, wood pallets are sufficiently valuable to justify, in many instances, the freight cost of return shipment for re-use.

Accordingly, industry has great need of an inexpensive, lightweight shipping pallet of the type described having sufficient strength to withstand heavy load stresses, shocks and handling abuses for a single, point to point transfer. The relevant economic reference level is defined by the handling and freight cost of unloaded return shipment.

Paper manufacturers and converters have, without success, attempted for years to satisfy this great market demand with pallets fabricated, at least partially, from corrugated paper board. However, construction of such prior art attempts was either too weak or too expensive.

SUMMARY OF THE INVENTION

The present invention teaches construction systems for heavy duty, industrial pallets incorporating laminated deck or platform surfaces comprising a core section fabricated from a multiplicity of narrow strips cut from single, double or triple wall corrugated paper board sheet stock. Said multiplicity of strips are adhesively secured together along the side wall faces thereof whereby the corrugation flute axes are perpendicular to the platform plane. In this assembly, the composite of opposite longitudinal strip edges form opposite planar surfaces to which is attached (adhesively) face laminae of corrugated paper board sheet.

Although the aforedescribed pallet deck core construction has been known and practiced in the past, when applied to long, unsupported spans (40 or more inches) it has been deemed necessary to face the core strip edge surface with more dense, and hence, more expensive, sheet material such as plywood, particle board or metal. While such dense deck facing materials function satisfactorily for the intended purpose, the attendant cost thereof too often raises the total pallet value above the critical economic threshold.

It has been discovered, as embodied in the present disclosure, that by fabricating the pallet deck core and facing sheets, both, of "A" flute or smaller, as specified by the Handbook of Corrugated and Solid Fibreboard and Products published by the Fibre Box Association, unexpected strength and rigidity are earned. For example, construction of a 1-inch-thick pallet deck core from double wall, double "A" flute, 42-pound kraft paper and faced with respective single laminations of single wall, "A" flute, 42-pound Kraft demonstrates a capacity for 122 inch-pounds of moment resistance per inch of width. From destructive testing and analysis, it was learned that failure of such a pallet deck was presaged by compressive failure of the upper face liner on the upper surface corrugated sheet. Buckling failure at a much lower stress level had been expected.

An additional, and also unexpected bonus to be derived from small flute corrugated paper core facing sheets was that of the shock energy absorptive capacity thereof. Approximately fifty percent of the total energy required to compressively collapse a pallet deck of the aforedescribed size and construction is absorbed by the corrugated face sheet before core failure begins. In terms of practical results, this property means that the deck core is protected by the resilient, shock absorbing properties of the corrugated face sheets which must be destroyed before the core is seriously attacked.

Accordingly, it is the object of the present invention to construct an inexpensive, heavy duty, industrial pallet deck entirely from corrugated paper board.

Another object of the present invention is to protect the corrugated paper board core of such a laminated deck from unusual shock with an inexpensive, energy absorbing surface sheet.

BRIEF DESCRIPTION OF THE DRAWINGS

FIG. 1 is a perspective illustration of a representative pallet having the upper face portion of the laminated deck torn to show construction of the interior details thereof according to the present invention.

FIG. 2 is an enlarged perspective illustration of a pallet deck showing a modified form of the invention.

FIG. 3 is a perspective illustration of another pallet construction system utilizing a further modification of the invention.

FIG. 4 is a compressive test force loading schematic of the type used to determine the data represented by the curve diagram of FIG. 5.

FIG. 5 is a stress-deformation curve diagram for a sample pallet deck constructed from 42-pound Kraft liner board fabricated into double wall, "A" flute corrugated core strips cut five-eighths inches edge to edge and single wall, "B" flute corrugated facing sheets.

DESCRIPTION OF THE PREFERRED EMBODIMENT

Referring initially to the pallet construction system shown by FIG. 1, the respective components thereof are seen to be a square or rectangular deck 1 supported at respective corners by blocks or legs 2. Blocks 2 are attached to the deck 1 by nails 3 or other suitable fasteners. Although four blocks 2 are shown, it is obvious that more or less may be used in various distribution patterns particularly suitable for a specific application. It is also obvious that the blocks 2 may be of materials other than wood such as metal, plastic or one of the many corrugated paper board constructions available.

Deck 1 is a complex laminated assembly having respective laminae structurally secured together with adhesive, e.g. casein, polyvinylacetate or resorcinol glue, or bonding, e.g. epoxy or polyester resin, substances. Broadly, deck 1 comprises a core 20 sandwiched between upper and lower facing sheets 30a and 30b, respectively.

The primary construction component of both, core 20 and facing sheets 30 is a thin solid sheet material and preferably heavy weight paper. A 26- or 42-pound kraft may be recommended for the core 20 whereas 69- or 90-pound kraft may be suitable for the facing sheets 30. It should be obvious, however, that other materials such as metal foils, plastics and resin inpregnated paper or fiberous glass materials may be substituted. An advantage of paper is the high strength to weight ratio and the fact that chemical substances such as diammonium phosphate, phenolics, fungacides and biocides are available for impregnation to inhibit deterioration by fire, moisture and/or insects.

The core construction of FIG. 1 illustrates a multiplicity of narrow strips (approximately ½ to 2 inches) 21a, 21b, 21c, etc. cut from double wall, double "A" flute corrugated sheet disposed in regular face-to-face alignment of respective liner sheets 22a, b and c, 23a, b and c, 24a, b and c, etc. Flute axes 26a, 26b, etc. of undulating spacer sheets 25a, 25b, etc. are aligned in parallel relation to the design load axis, F. Peaks and valleys of the undulating spacers 25a, 25b, etc., are structurally secured to respective liners 22a, b and c by pressure set adhesives or resins along the entire length of respective crests. Similarly, juxtaposed liner sheets 22c and 23a of adjacent strips 21a and 21b, respectively, are structurally secured together.

To the planar surfaces defined by the upper and lower edges of strip liner walls 23, 23, 24 and etc. are applied facing sheets 30a and 30b, both comprising single wall, "B" flute corrugated sheet. Flute axes 29a, 29b, etc. of the undulating spacer sheet 28 between liner sheets 27a and 27b are perpendicularly disposed to both, core flute axes 26a, 26b, etc. and core strip liners 22, 23, 24, etc.

In the FIG. 2 embodiment of the invention, core 40 is fabricated from strips 41a, 41b, etc. of triple wall, triple "A" corrugated sheet, disposed with the flute axes 46a, 46b, 46c, etc. parallel with the pallet loading direction F. Flute axes 29a, 29b, etc. of facing sheets 30a and 30b are disposed perpendicular to core flute axes 46 but parallel with core liner sheets 42, 43, etc.

The pallet fabrication system of FIG. 3 is of double deck construction having the strength of two deck components 4a and 4b separated by six spacer blocks 5. For greater shock absorptive capacity, deck faces 50a and 50b are of double wall, double "A" or double "C" flute, corrugated sheet. Core 60 may be fabricated from strips of single, double or triple wall corrugated of any convenient flute size. For good bending strength in both azimuth axes $x$ and $y$, however, the flute axes of facing sheets 50a and 50b should be perpendicular to both, the core flute axes and the core liner planes. For maximum bending strength in a single azimuth axis, $y$ for example, at a sacrifice of strength in the $x$ axis, the core liner planes should be arranged to parallel the facing sheet flute axes.

FIG. 4 is a schematic illustration of test apparatus used to develop data graphically represented by FIG. 5. Shown by FIG. 4 is a test sample of pallet deck 1 crushed between the ram 61 and anvil 62 of a force F measuring load cell device.

Relating the destruction of sample 1 to the stress-deformation curve of FIG. 5, peaks 30a, 30b and 20 correspond to the compressive failure of deck elements 30a, 30b and 20, respectively. Point P is the curve intersecting location for locus E, the linear extrapolation of slope $C_2$. Area $A_1$ is representative of the energy absorbed by facing sheets 30a and 30b, collectively and is derived by the integral of locus $C_1$ from O to P as reduced by the integral of locus E from $s = o$ to P. Area $A_2$ is representative of crushing energy absorbed by core 20 exclusively. It may be seen by comparing the relative quantity of area $A_1$ to area $A_2$ that the two are substantially equal. The significance of this equality is the relative capacity of this invention to tolerate assymetrically distributed load stresses and localized shocks. Such forces are compliantly accommodated by the facing sheets 30a and 30b before the core 20 is weakened or destroyed thereby.

Another advantage to using corrugated sheet as facing for the core 20 resides in the capacity of the system for bonding integrity. It is virtually impossible to cut and assemble the core strips 21a, 21b, 21c, etc. so as to form a perfectly planar surface parallel with the platform plane. When this surface is faced with a more rigid material such as plywood or particle board, structural adhesion is attained only at the high points of core plane. Due to resilience of the corrugated sheet, however, only a slight gluing pressure is required to press the inner liner sheet 27b into intimate contact with all core section edges.

Within the scope of the appended claims, it will be obvious to those of skill in the art that many permutations of the invention may be assembled by discrete selections of solid sheet properties, flute size and numbers of corrugated sheet walls for the core and facing sheets, respectively. Moreover, the upper and lower facing sheets, 30a and 30b need not be of identical construction.

I claim:

1. A pallet structure comprising a load supporting deck having a multiplicity of legs attached thereto for supporting said deck at a predetermined distance above a planar support surface:

said deck comprising a planar core laminate flanked on opposite planar surfaces by face laminae;

said core laminate comprising a multiplicity of planar strips formed from thin solid sheet material and having small height relative to length, said strips aligned in spaced, parallel relationship and separated by substantially continuous undulating strips of thin solid sheet material substantially equal in height to said planar strips, the undulations of said strips forming regularly spaced flutes having parallel axes and peaks, said peaks of said flutes being structurally secured to oppositely facing surfaces of adjacent planar strips, said flute axes being parallel with the planes of said planar strips and perpendicular to the longitudinal edge thereof;

each of said face laminae comprising respectively parallel inner and outer facing sheets of thin solid sheet material, the planes thereof separated by substantially continuous undulating sheets of thin solid sheet material, the undulations of said sheets forming regularly spaced flutes having parallel axes and peaks, said peaks of said flutes being structurally secured to oppositely facing surfaces of said inner and outer facing sheets, said face laminae respectively secured to oppositely facing surfaces of said core laminate whereby said core laminate flute axes are perpendicular to said face laminae flute axes and said inner and outer facing sheets.

2. A pallet structure as described by claim 1 wherein said face laminae flute axes are also perpendicular to said planar strips.

3. A pallet structure as described by claim 1 wherein said face laminae flute axes are also parallel with said planar strips.

4. A pallet structure as described by claim 1 wherein said face laminae comprise a plurality of parallel planar sheets of thin solid sheet material, adjacent planar sheets being spacially separated by substantially continuous undulating sheets of thin solid sheet material, undulations of said sheets forming regularly spaced flutes having parallel axes and peaks, said peaks of said flutes being structurally secured to oppositely facing surfaces of adjacent planar sheets.

5. A pallet structure as described by claim 1 where said core laminate and said face laminae flutes are no larger than Fibre Box Association "A."

6. A pallet structure as described by claim 1 wherein said thin sheet material is paper.

7. A pallet structure as described by claim 6 wherein said paper is chemically impregnated to inhibit deterioration by fire, moisture or insects.

8. A pallet structure as described by claim 4 wherein the flute axes of at least one of said face laminae undulating sheets are also parallel to said planar strips.

9. A pallet structure as described by claim 4 wherein the flute axes of at least one of said face laminae undulating sheets are also perpendicular to said planar strips.

10. A pallet structure as described by claim 4 wherein flute axes of at least one of said face laminae undulating sheets are also parallel to said planar strips and the flute axes of at least one other of said face laminae undulating sheets are also perpendicular to said planar strips.

* * * * *